No. 838,259. PATENTED DEC. 11, 1906.
A. N. MANROSS.
TRANSMISSION MECHANISM.
APPLICATION FILED JUNE 1, 1906.
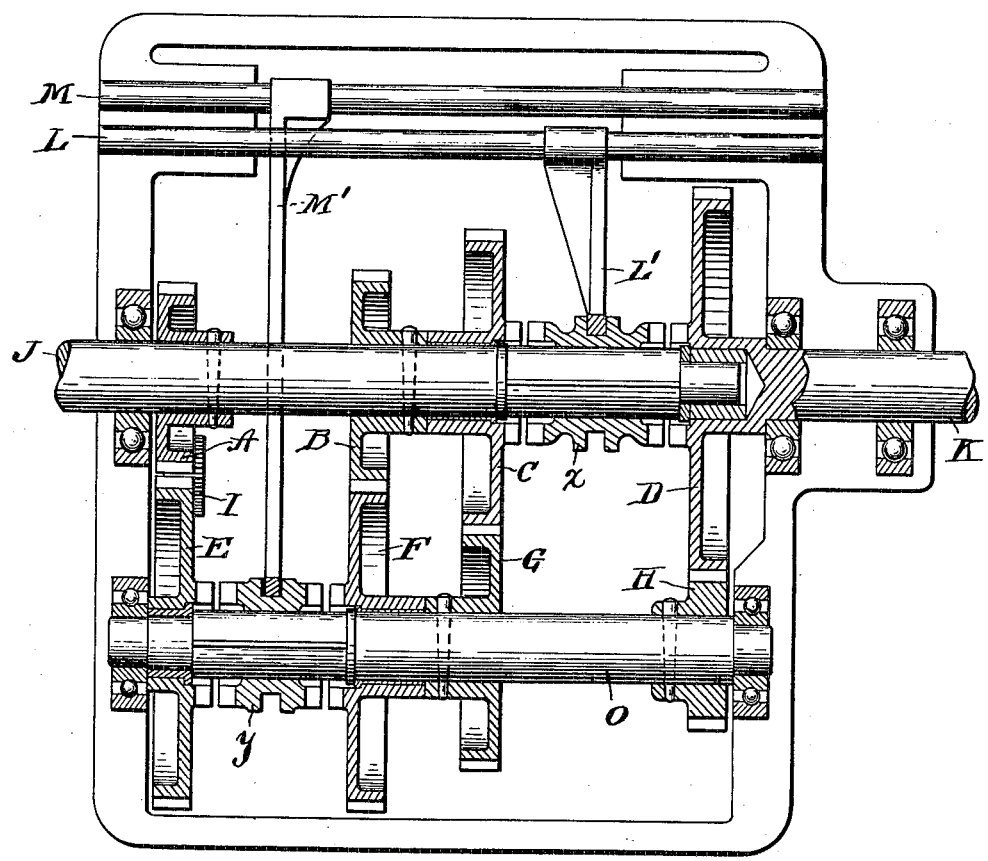
Witnesses
Inventor
A. N. Manross
By his Attorneys

UNITED STATES PATENT OFFICE.

ARTHUR N. MANROSS, OF NEW BRITAIN, CONNECTICUT, ASSIGNOR TO CORBIN MOTOR VEHICLE CORPORATION, OF NEW BRITAIN, CONNECTICUT, A CORPORATION OF CONNECTICUT.

TRANSMISSION MECHANISM.

No. 838,259.　　　　Specification of Letters Patent.　　　　Patented Dec. 11, 1906.

Application filed June 1, 1906. Serial No. 319,680.

*To all whom it may concern:*

Be it known that I, ARTHUR N. MANROSS, a citizen of the United States, residing at New Britain, county of Hartford, Connecticut, have invented certain new and useful Improvements in Transmission Mechanism, of which the following is a full, clear, and exact description.

My invention relates to power-transmission mechanism, particularly useful for automobiles or motor-vehicles.

The object of the invention is to provide a simple and effective means for varying the speed of the driven shaft relative to the driving shaft or entirely disconnecting the same therefrom.

The accompanying drawing illustrates in plan a gear case or frame, the cover being removed to show the interior arrangement of gears and clutches, the said gears and clutches themselves being shown in section.

A, B, C, D, E, F, G, H, and I represent gears of different ratios.

X and Y represent clutches.

J is the driving-shaft.

K is the driven shaft having suitable bearings.

L is a draw-bar which may be shifted to and fro by any suitable means and by means of which the clutch X may be controlled. L' is an arm carried by the draw-bar L, and by which engagement is effected between said draw-bar and said clutch. M is another draw-bar, and M' (indicated in dotted lines) is an arm carried by said bar and by which the same is connected with the clutch Y.

O is a counter-shaft.

All of the shafts have suitable bearings.

The clutches X and Y are splined to or squared on the driving-shaft J and counter-shaft O, respectively, but are capable of being shifted longitudinally thereon. The clutch X is provided with clutch-dogs on each end, arranged to engage with corresponding dogs on the hubs of the gears C or D. The clutch Y has clutch-dogs on each end, which may be engaged with corresponding dogs on the hubs of the gears E or F.

The gears A and B are fixed on the driving-shaft J, while the gear C is normally loose thereon. The gears G and H are fixed on the counter-shaft O, while gears E and F are normally loose thereon. The gear I is merely an intermediate pinion between gears A and E and used for the purpose of reversing. In the drawing it is shown as slightly offset simply so that it may be seen. Obviously in practice it would be directly behind the gears A and B when viewed from above, as shown in the drawing.

For first speed-ahead power is transmitted from the driving to the driven shaft through the gears B, F, H, and D, the clutch Y being shifted to the right, so as to lock gear F on the counter-shaft O, whereupon the same will be driven by gear B. For second speed-ahead the clutch Y is first thrown back to its neutral position, (indicated in the drawing,) and then the clutch X is shifted to the left, so as to lock gear C to the driving-shaft J, whereupon power will be transmitted to the driven shaft K by gears C, G, H, and D. For third speed-ahead or high speed in this particular arrangement the clutch X is shifted to the right, so as to lock into gear D, (first freeing gear C.) Inasmuch as gear D is fixed on the driven shaft K, the power will then be transmitted directly from the driving-shaft J to the driven shaft K through said clutch connection. To reverse, the clutch X is restored to its normal idle position (indicated in the drawing) and the clutch Y is thrown to the left into engagement with gear F, whereupon, the latter being then locked on the counter-shaft O, the counter-shaft will be driven in a reverse direction through the operation of pinion I and power then be transmitted through gears H and D to the driven shaft K, turning it in a reverse direction.

From the foregoing it will be seen that the transmission of each of the several different speeds measured by the difference in ratios of the various gear combinations is effected by a positive clutch. All of the gears on the main shaft are always in mesh with all of the gears on the counter-shaft, one gear in each speed combination being free to rotate on its respective shaft. When a certain speed is desired, the free gear in that particular combination is positively locked to its shaft without danger of chipping or breaking the teeth. By this arrangement only about one-third or one-half of the lateral shifting motion is required to make a change than is required in the usual sliding-gear system. The movement of the operating-lever is therefore correspondingly less, and the case can be made very compact and symmetrical.

What I claim is—

1. In a transmission system a driving-shaft, a driven shaft in line therewith, a counter-shaft, a plurality of gears on the driving-shaft, a single gear fixed on the driven shaft, gears on the counter-shaft which are always in mesh with the gears on the driving and driven shafts, one of the gears in each combination on the driving-shaft and counter-shaft being loose, a clutch on the driving-shaft arranged to lock together the driving and driven shafts when in one position and to lock one of the loose gears on the driving-shaft when in another position, and a clutch on the counter-shaft arranged to lock one of the loose gears thereon when in one position and another loose gear thereon when in another position.

2. In a transmission system a driving-shaft, a driven shaft in line therewith, a counter-shaft, a plurality of gears on the driving-shaft, a single gear fixed on the driven shaft, gears on the counter-shaft which are always in mesh with the gears on the driving and driven shafts, one of the gears in each combination on the driving-shaft and counter-shaft being loose, a clutch on the driving-shaft arranged to lock together the driving and driven shafts when in one position and to lock one of the loose gears on the driving-shaft when in another position, and a clutch on the counter-shaft arranged to lock one of the loose gears thereon when in one position and another loose gear thereon when in another position, one of the gear combinations on the driving and counter shaft including an intermediate pinion.

3. In a power-transmission apparatus, a driving-shaft, a driven shaft in line therewith, a counter-shaft, two fixed gears of different ratios on the driving-shaft, a gear revolubly mounted on said driving-shaft, two gears revolubly mounted on the counter-shaft, one meshing directly with one of the fixed gears on the driving-shaft, the other meshing indirectly through the medium of a pinion with the other fixed gear on the driving-shaft, two fixed gears on the counter-shaft one meshing directly with the loose gear on the driving-shaft and the other meshing directly with the fixed gear on the driven shaft, two clutches carried by the driving and the counter shaft respectively, said clutches being locked against rotation thereon but free to slide, and means for sliding said gears whereby any one of the gear combinations may be coupled for driving while the others are idle, one of said clutches being arranged to lock together the driving and the driven shafts by direct connection.

ARTHUR N. MANROSS.

Witnesses:
G. ERNEST ROOT,
WM. V. COLLINS.